2 Sheets--Sheet 1.

J. OLMSTED.
Electro-Magnetic Telegraph.

No. 167,685. Patented Sept. 14, 1875.

Witnesses.
W. E. Chaffee.
Edmund Masson.

Inventor:
Joseph Olmsted,
By Atty. A. B. Stoughton.

N. PETERS, PHOTO-LITHOGRAPHER, WASHINGTON, D. C.

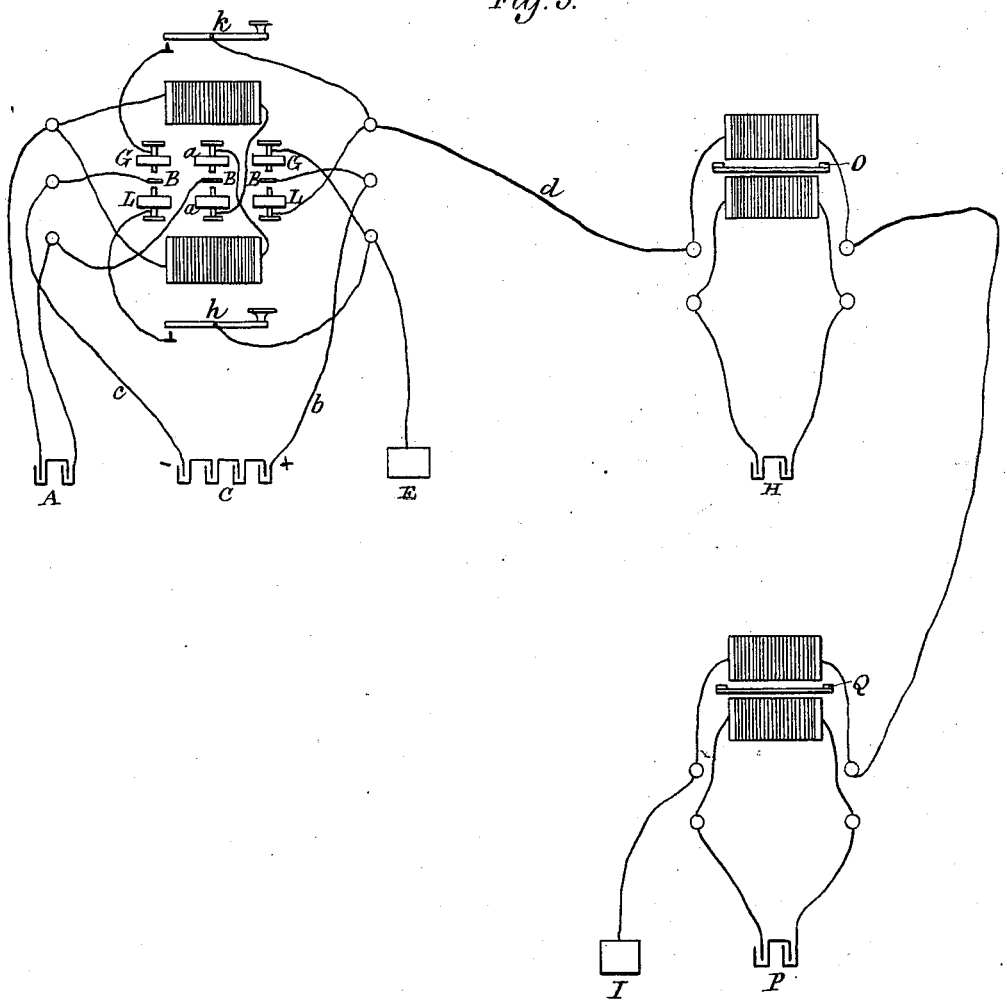

UNITED STATES PATENT OFFICE.

JOSEPH OLMSTED, OF PROVIDENCE, RHODE ISLAND, ASSIGNOR OF ONE-HALF HIS RIGHT TO CHARLES G. McKNIGHT AND GEORGE CHATTERTON, OF SAME PLACE.

IMPROVEMENT IN ELECTRO-MAGNETIC TELEGRAPHS.

Specification forming part of Letters Patent No. 167,685, dated September 14, 1875; application filed May 15, 1875.

*To all whom it may concern:*

Be it known that I, JOSEPH OLMSTED, of Providence, in the county of Providence and State of Rhode Island, have invented certain new and useful Improvements in Electro-Magnetic Telegraphs; and I do hereby declare the following to be a full, clear, and exact description of the same, reference being had to the accompanying drawings, making a part of this specification, in which—

Figure 1:
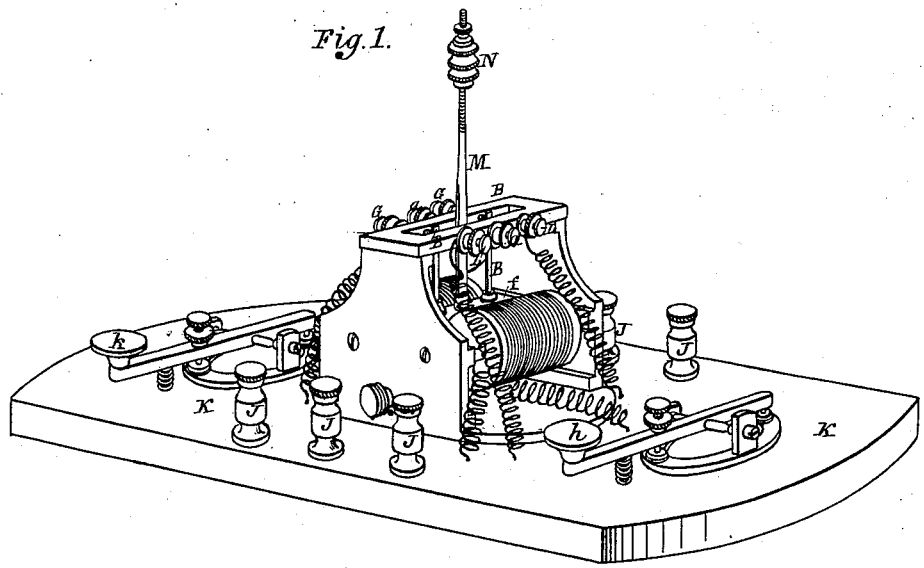
Figure 2:
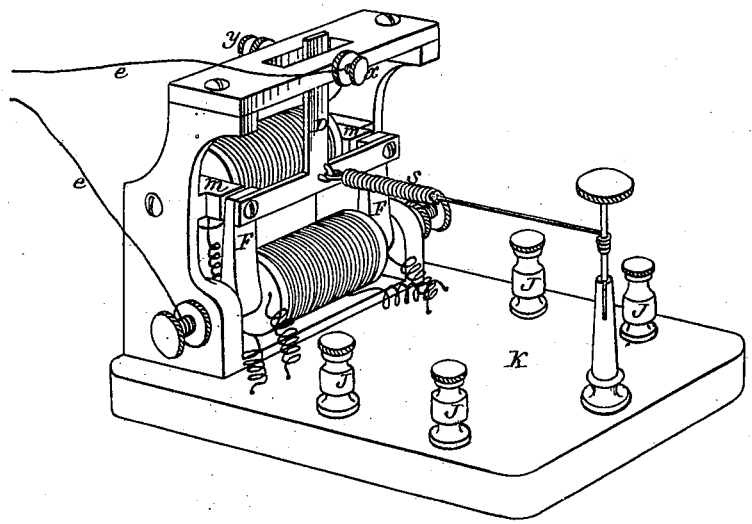

Figure 1 represents in perspective a transmitting-instrument with two keys for transmitting two messages at the same time—one through the positive and the other through the negative current. Fig. 2 represents in perspective one of the receiving-instruments, there being two—one for each current and message—both exactly alike in construction, but with their polarities reversed, one only being shown in the drawing, as both would appear therein exactly alike. Fig. 3 represents a diagram showing how the conductors are closed and opened for alternating the currents through the line and relays.

My invention consists in combining, with alternating currents running through the line and relays, two keys for transmitting independent messages at one and the same time. It further consists in the combination of a double-keyed transmitting-instrument with two receiving-instruments having the polarities of their armatures reversed.

My invention, relating to what is known as a duplex telegraph, is carried out by reversing the poles of the relay-magnet rapidly by the transmission of a negative and positive current of electricity in rapid succession over the line, and placing keys for the purpose of opening and closing the circuit in such manner as may correspond with the poles of the battery, so that by opening either key the current will flow only in one direction over the line, as will be now described in connection with the figures and diagram, Fig. 1 showing what I term a motor for changing the poles of the battery in relation to the line, said motor being run by a local battery, arranged for that purpose through or by means of an automatic break-piece or circuit-closers.

In the diagram, Fig. 3, *a a* represent the break-pieces or circuit-closers, and *h h* represent the two keys. L L and G G represent contact-points for the alternating current. B B represent springs, which are connected to or with the battery-wires which run to each pole of the battery, and keep in rapid vibration between the contact-points L L and G G, so that when the springs B B are in contact with the points L L the negative pole of the battery is closed with the line, and when in contact with the points G G, the negative pole is closed with the ground, thereby reversing the current throughout the circuit and throughout the relays. When the current is opened by means of the key *k* it will flow in one direction only.

The instruments used for receiving messages are two electro-magnets, (one only being shown in the drawing, Fig. 2,) with armatures of opposite polarities, F representing the polarized armature, and *m* the relay-magnet, the poles of which are reversed alternately when the keys are both closed, and the arm D attached to the polarized armature F is kept in rapid vibration between the adjustable screws *x y;* but when the circuit is broken at key *h* the magnetism of the polarized armature F and relay *m* is neutralized, because the conditions that caused them to attract have been destroyed by removing the negative pole of the battery from the line, and contact only kept up through the connecting-points G G, in consequence of which the arm D is drawn back firmly against the adjusting-screw *x* by means of the spring *s*, and remains in contact with that point until the key *h* is again closed. The local circuit *e e* to the sounder is closed from the back stop *x*, as seen in Fig. 2.

It will be readily understood, then, that when the currents are passing (either the + or —, or both) that the armature-levers of the appropriate polarized relays are vibrating with such rapidity that when they touch against the back stops the closures are so exceedingly momentary that the sounders are not affected thereby. Now, if the key controlling the + current be opened, that current is cut off from the line, and the relay whose armature and coils are so adjusted that the armature is attracted by the + current ceases to act, and the spring pulls the lever against the back stop, causing a complete closure of the local circuit to its sounder so long as such + current is cut off from the line. When the — key is depressed the same result ensues in the — relay; and, when both are simultaneously depressed, the same result ensues in both.

It is evident that each station may be provided with + and — keys and + and — relays, (then one commutator only being necessary for the line,) and that two messages may be sent simultaneously in opposite directions as well as in the same direction, the principle and operation being the same.

By this system and construction the Morse alphabet can be easily made and used by operating separately or together without one transmission interfering with the other.

In the diagram, Fig. 3, the motor-battery is represented at A, the main battery at C, and the ground-connection at E. The wire for the positive current is shown at $b$, and that for the negative current at $c$, while $d$ represents the line-wire. On the right of the diagram, showing the receiving-currents, H represents the local battery for the permanent magnet or polarized armature O. P represents the local battery for the polarized armature Q, and I is the ground-connection. In Fig. 2, representing one of the receiving instruments, $e$ $e$ represent the conductors to the sounder. J, Figs. 1 and 2, represent the posts on the base or table K, for making the wire-connections, as shown in the diagram. The arm M, with its adjustable weight N, is for the purpose of regulating the vibration of the springs B between the contact-points G and L. The springs B, as well as the regulating-arm M', are attached to a vibrator or armature, $f$. The telegraph is represented as in condition for making the Morse alphabet when the circuit of the main line is open.

When the key $h$ is opened, and that $k$ is closed, then the current passes through $k$ to the line, and through the relays. When the $h$ is closed, and that $k$ opened, the negative pole of the battery is closed with the line, and the current goes through the relays in the reverse direction. When both keys are there is no action of the current over the line, and the spring $s$ draws the vibrator D away from the magnet.

Having thus fully described my invention, what I claim is—

The combination, with a telegraph-line, of a commutator, charging the line with alternating currents, a pair or series of pairs of keys, and a pair or series of pairs of relays, one of the keys of a pair acting to cut off from the line the + currents only, the other to cut off the — currents, and one relay of each pair being arranged so as to vibrate by the passage therethrough of + currents, and the other by the — currents, and both relays arranged to give a signal or close a local circuit upon the cutting off from the line of the currents affecting it, substantially as and for the purposes described.

JOSEPH OLMSTED.

Witnesses:
   A. B. STOUGHTON,
   EDMUND MASSON.